US012271025B1

(12) United States Patent
Lian et al.

(10) Patent No.: US 12,271,025 B1
(45) Date of Patent: Apr. 8, 2025

(54) CAPILLARY ARRAY AND PREPARATION METHOD AND APPLICATION THEREFOR

(71) Applicant: CHINA BUILDING MATERIALS ACADEMY CO., LTD., Beijing (CN)

(72) Inventors: Jiao Lian, Beijing (CN); Hui Liu, Beijing (CN); Jinsheng Jia, Beijing (CN); Chang Liu, Beijing (CN); Shuaiqi Li, Beijing (CN); Wenjing Qin, Beijing (CN); Ang Li, Beijing (CN); Hua Cai, Beijing (CN); Tiezhu Bo, Beijing (CN); Yonggang Huang, Beijing (CN); Shiyong Xie, Beijing (CN); Jing Ma, Beijing (CN)

(73) Assignee: CHINA BUILDING MATERIALS ACADEMY CO., LTD., Beijing (CN)

( * ) Notice: Subject to any disclaimer, the term of this patent is extended or adjusted under 35 U.S.C. 154(b) by 0 days.

(21) Appl. No.: 18/842,284

(22) PCT Filed: Jan. 31, 2024

(86) PCT No.: PCT/CN2024/074871
§ 371 (c)(1),
(2) Date: Aug. 28, 2024

(30) Foreign Application Priority Data

Nov. 9, 2023 (CN) .......................... 202311482047.1

(51) Int. Cl.
*G02B 6/02* (2006.01)
*C03B 29/14* (2006.01)
(Continued)

(52) U.S. Cl.
CPC .......... *G02B 6/02304* (2013.01); *C03B 29/14* (2013.01); *C03B 37/0124* (2013.01);
(Continued)

(58) Field of Classification Search
CPC .... G01T 1/201; G01T 1/2033; G02B 6/02347
See application file for complete search history.

(56) References Cited

U.S. PATENT DOCUMENTS 9,069,084 B2 * 6/2015 Frank ...................... G01T 1/201
9,482,763 B2 * 11/2016 Vasilyev ................ G01V 5/125
(Continued)

FOREIGN PATENT DOCUMENTS

CN      108919335 A    11/2018
CN      114127585 A     3/2022
(Continued)

OTHER PUBLICATIONS

US11733402, 12/2002, Gerlah et al. (withdrawn)
Chinese Notice to Grant Patent dated Dec. 19, 2023 as received in application No. 202311482047.1.

*Primary Examiner* — Rhonda S Peace
(74) *Attorney, Agent, or Firm* — Maschoff Brennan

(57) ABSTRACT

A capillary array includes a capillary region, including capillaries of a first glass, which are disposed in an axis-parallel manner. A low refractive index layer is disposed on an inner wall of each of the capillaries, the refractive index of each low refractive index layer being less than a refractive index of a liquid scintillator. A second glass material is disposed between adjacent capillaries. A softening point of the first glass is $T_1$, a softening point of second glass is $T_2$, and a value of $T_1$ minus $T_2$ is in a range from 30° C. to 50° C. A thermal expansion coefficient of the first glass is $\alpha_1$. An edge covering region is disposed on an outer side of the capillary region and makes contact with an outer side face of the capillary region, wherein a material of the edge covering region is a third glass.

11 Claims, 3 Drawing Sheets

(51) Int. Cl.
   *C03B 37/012*   (2006.01)
   *C03B 37/028*   (2006.01)
   *G02B 6/36*     (2006.01)
   *G01T 3/06*     (2006.01)

(52) U.S. Cl.
   CPC .......... *C03B 37/028* (2013.01); *G02B 6/3672* (2013.01); *C03B 2203/16* (2013.01); *C03B 2203/40* (2013.01); *G01T 3/06* (2013.01)

(56) References Cited

U.S. PATENT DOCUMENTS

| | | | |
|---|---|---|---|
| 10,358,376 B2* | 7/2019 | Morse | B29C 43/00 |
| 11,402,516 B2* | 8/2022 | Brodsky | G01T 3/06 |
| 2019/0010076 A1 | 1/2019 | Morse et al. | |

FOREIGN PATENT DOCUMENTS

| | | |
|---|---|---|
| CN | 115981127 A | 4/2023 |
| FR | 2853084 A1 | 10/2004 |
| JP | 2017133894 A | 8/2017 |

* cited by examiner

CAPILLARY ARRAY AND PREPARATION METHOD AND APPLICATION THEREFOR

CROSS-REFERENCE TO RELATED APPLICATION

The present application claims the priority of the Chinese patent application No. 202311482047.1 filed to the China Patent Office on Nov. 9, 2023, and entitled "Capillary Array and Preparation Method and Application Therefor", of which the entire contents are incorporated herein by reference.

TECHNICAL FIELD

The present application belongs to the technical field of fast neutron detection devices, and particularly relates to a capillary array, and a preparation method and application therefor.

BACKGROUND

A liquid scintillator fiber optical panel is to make a capillary array filled with a liquid scintillator. A detection principle is that fast neutrons bombard hydrogen nuclei in the liquid scintillator, and stimulate the liquid scintillator to emit visible fluorescence, and part of the visible fluorescence undergoes total reflection on an inner wall of a capillary, is transferred from an emitting end of the liquid scintillator fiber optical panel, and is received by photosensitive elements such as a CCD or a CMOS, thus achieving the detection of the fast neutrons.

A preparation method of the liquid scintillator fiber optical panel in the prior art is as follows: a low-refractive-index glass circular tube is drawn into capillary monofilaments, and then the capillary monofilaments are arranged into a hexagonal-prism multifilament rod which is then drawn into capillary multifilaments, where each multifilament contains a plurality of capillary fibers at this time; then, the multifilaments are cut into capillary fiber bundles, and heated and fused to form a billet; and finally, two ends of the billet are cut into flat surfaces, capillaries are filled with liquid scintillators, and two ends are covered with lenses or fiber optical panels for packaging.

However, there are currently the following problems with the liquid scintillator fiber optical panel: first, although absorption fibers have been inserted between the adjacent capillaries during panel arrangement to reduce light crosstalk between the adjacent capillaries, some light still penetrates through the capillaries to become crosstalk light, resulting in a decrease in spatial resolution. Second, since a refractive index of the liquid scintillator is low and is generally only in a range from 1.5 to 1.8, in order to ensure fiber optical image transmission, a refractive index of the capillaries must be less than that of the liquid scintillator, but there is less glass with a refractive index less than that of the liquid scintillator. A refractive index of quartz glass is 1.46, but due to its high softening point, there is no suitable extramural absorption filament to match, making it difficult to solve a problem of light crosstalk between the capillaries. Fluoride glass has a low refractive index, which may be reduced to below 1.4, but its fiber forming performance is poor, and the fluoride glass is prone to crystallization at a high temperature, making it unsuitable for drawing the capillaries. Therefore, capillary glass can only choose glass with a higher refractive index, but due to a small difference between the refractive index of the liquid scintillator and the refractive index of the capillaries, the numerical aperture of the liquid scintillator fiber optical panel is low. Third, the capillaries are usually circular, pixels of the photosensitive elements such as the CCD or the CMOS connected with the emitting end are all square, and the liquid scintillator fiber optical panel does not correspond to the pixels of the CCD or CMPO elements one to one, resulting in low coupling efficiency.

SUMMARY OF THE INVENTION

The main objective of the present application is to provide a capillary array and a preparation method and application therefor. The technical problem to be solved is how to prepare a capillary array that enables a liquid scintillator fiber optical panel made of the capillary array to have a high spatial resolution, high aperture uniformity, a high numerical aperture, high coupling efficiency, and a simple preparation process, thereby making it more suitable for practical use.

The objective of the present application and the solution to its technical problem are achieved through the following technical solutions. A capillary array provided according to the present application includes:

a capillary region, including a plurality of capillaries of a first glass material, wherein the capillaries are disposed in an axis-parallel manner; a low refractive index layer is disposed on an inner wall of each of the capillaries; a refractive index of each low refractive index layer is less than a refractive index of a liquid scintillator; a light absorption layer of a second glass material is disposed between any two adjacent capillaries; a softening point of first glass is $T_1$, and a softening point of second glass is $T_2$, wherein a value of $T_1$ minus $T_2$ is in a range from 30° C. to 50° C.; and a thermal expansion coefficient of the first glass is $\alpha_1$; and an edge covering region, disposed on an outer side of the capillary region and making contact with an outer side face of the capillary region, wherein a material of the edge covering region is third glass, a softening point of the third glass is $T_3$, wherein a value of $T_2$ minus $T_3$ is in a range from 50° C. to 100° C.; and a thermal expansion coefficient of the third glass is $\alpha_3$, wherein a value of $\alpha_1$ minus $\alpha_3$ is in a range from $2\times10^{-7}$/° C. to $10\times10^{-7}$/° C.

The objective of the present application and the solution to its technical problem may be further achieved through the following technical measures.

Optionally, in the aforementioned capillary array, an inner diameter of each capillary is in a range from 10 microns to 99 microns.

Optionally, in the aforementioned capillary array, each low refractive index layer is an $SiO_2$ layer, with a thickness being ≥0.5 μm.

Optionally, in the aforementioned capillary array, a single-side thickness of the edge covering region is in a range from 5 mm to 20 mm in a radial direction of the capillaries.

Optionally, in the aforementioned capillary array, a radial cross-section of the single capillary is square.

Optionally, in the aforementioned capillary array, each light absorption layer is composed of light absorption glass, or composed of the light absorption glass and low softening point glass.

The objective of the present application and the solution to its technical problem are further achieved through the following technical solutions. A preparation method for a capillary array provided according to the present application includes the following steps:

S1, arranging and drawing glass prefabricated tubes to form multifilaments, wherein each glass prefabricated tube is composed of first glass on an inner side and second glass on an outer side; a softening point of each first glass is $T_1$, a softening point of each second glass is $T_2$, wherein a value of $T_1$ minus $T_2$ is in a range from 30° C. to 50° C.; and a thermal expansion coefficient of the first glass is $\alpha_1$;

S2, obtaining a billet by arranging the multifilaments into a capillary bundle, and then wrapping a plurality of layers of third glass monofilaments around a periphery of the capillary bundle to form an edge covering region, wherein a softening point of third glass is $T_3$, and a value of $T_2$ minus $T_3$ is in a range from 50° C. to 100° C.; and a thermal expansion coefficient of the third glass is $\alpha_3$, wherein a value of $\alpha_1$ minus $\alpha_3$ is in a range from $2\times10^{-7}$/° C. to $10\times10^{-7}$/° C.;

S3, melting and pressing the billet, and then cutting two end faces of the billet flat, a temperature T of the melting and pressing being: $T_2<T<T_1$; and S4, plating a low refractive index layer in each capillary that consists the capillary bundle, a refractive index of the low refractive index layer being less than a refractive index of a liquid scintillator.

The objective of the present application and the solution to its technical problem may be further achieved through the following technical measures.

Optionally, in the aforementioned preparation method, a preparation method for the glass prefabricated tubes is as follows:

A, processing the first glass into a glass tube, a cross-section of the glass tube being an annular section with a square inner side contour and a square outer side contour; processing the second glass into a glass rod with a square cross-section; and drawing the glass rod into second glass monofilaments; and B, arranging the second glass monofilaments around a periphery of the glass tube in a fully coating manner to form the glass prefabricated tubes, the second glass monofilaments being light absorption glass monofilaments, or the light absorption glass monofilaments and low softening point glass monofilaments.

Optionally, in the aforementioned preparation method, a radial cross-section of each glass prefabricated tube is an annular cross-section with a square inner side contour and a square outer side contour.

Optionally, in the aforementioned preparation method, a method for coating the low refractive index layers is an atomic layer deposition method; and each low refractive index layer is an $SiO_2$ layer, with a thickness being $\geq 0.5$ μm.

The objective of the present application and the solution to its technical problem are further achieved through the following technical solutions. A liquid scintillation fiber optical panel provided according to the present application includes:

the aforementioned capillary array;
a liquid scintillator, filled in each capillary of the capillary array; and
end-sealing components, covering two ends of the capillary array filled with the liquid scintillator.

Through the above technical solutions, the capillary array and the preparation method and application therefor provided by the present application have at least the following advantages:

The present application provides the capillary array and the preparation method and application therefor. By arranging the low refractive index layers on the inner walls of the capillaries, the low refractive index layers may serve as outer layers of optical fibers after filling the capillaries with the liquid scintillators later, the liquid scintillators may serve as core layers of the optical fibers, and the two cooperate to form an optical fiber structure of "liquid scintillator in a middle region and low refractive index layer around the liquid scintillator", which may avoid the limitation of the fewer selection type of low refractive index glass on the outer layers of the liquid scintillator optical fibers, thereby expanding a selection range of the first glass material, and meanwhile also improving a numerical aperture of the optical fibers by controlling the difference between the refractive indexes of the two; by arranging the light absorption layers of the second glass material between any two adjacent capillaries, the light absorption layers tightly coat the outer sides of the capillaries, which effectively blocks crosstalk light between the capillaries, and avoids or reduces the crosstalk of light between the two adjacent capillaries, thereby improving spatial resolution; and by reasonably designing the softening point temperatures of the first glass, the second glass, and the third glass, in a manner of coating the capillaries of the first glass material with the second glass with the low softening point, and coating the capillary array with the third glass with the lower softening point, the prepared capillaries can maintain the original shapes of the glass tubes. In this way, if original glass tubes are circular, the subsequent capillaries are also circular; if the original glass tubes are square, then the subsequent capillaries are also square; that is to say, shapes of hollow pores in the capillaries are controlled and have good shape retention, resulting in high uniformity of the apertures of the capillaries.

Furthermore, by controlling the square cross-sections of the original glass tubes, a cross-section of each light transmission channel in the liquid scintillator fiber optical panel prepared therefrom is in a square shape, which enables a single capillary to correspond to square pixels of photosensitive elements such as a CCD or a CMOS one to one, thereby improving its coupling efficiency.

Furthermore, a capillary material in a traditional liquid scintillator fiber optical panel must simultaneously meet the requirements of low refractive index, the ability to add an extramural absorption layer, and the ability to form fibers. The present application obtains the low refractive index layers by coating low refractive index films on the inner walls of the capillaries. Therefore, there is no restriction on the refractive index of the glass itself of the capillary walls. Softening points of most glass meet the requirement for adding the extramural absorption layer, only the fiber forming requirement needs to be met to achieve the effect of the present application, and a preparation process is simple.

The above description is only an overview of the technical solutions of the present application. In order to have a clearer understanding of the technical means of the present application and to implement them in accordance with the content of the specification, the following will make detailed illustration with the preferred embodiments of the present application in conjunction with the accompanying drawings.

DETAILED DESCRIPTION

In order to further elaborate on the technical means and effects adopted by the present application to achieve the intended invention objectives, the following provides a detailed description of specific implementations, structures, features, and effects of a capillary array and a preparation method and application therefor provided according to the present application in conjunction with accompanying drawings and preferred embodiments. In the following description, different "an embodiment" or "embodiments" do not necessarily refer to the same embodiment. In addition, specific features, structures, or characteristics in one or more embodiments may be combined in any suitable form.

Figure 1:
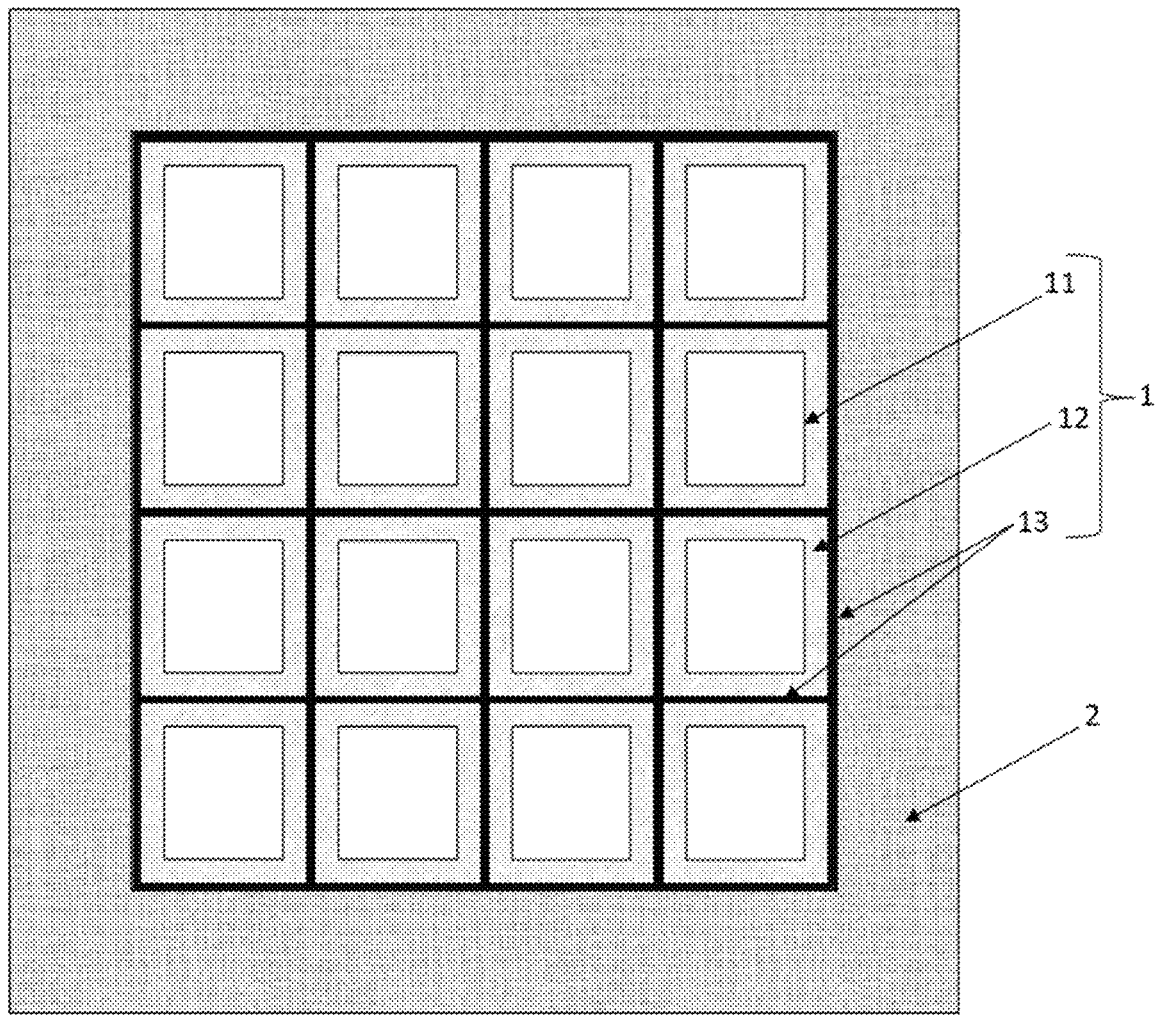
FIG. 1 is a schematic structural diagram of a capillary array in the present application.
Figure 2:
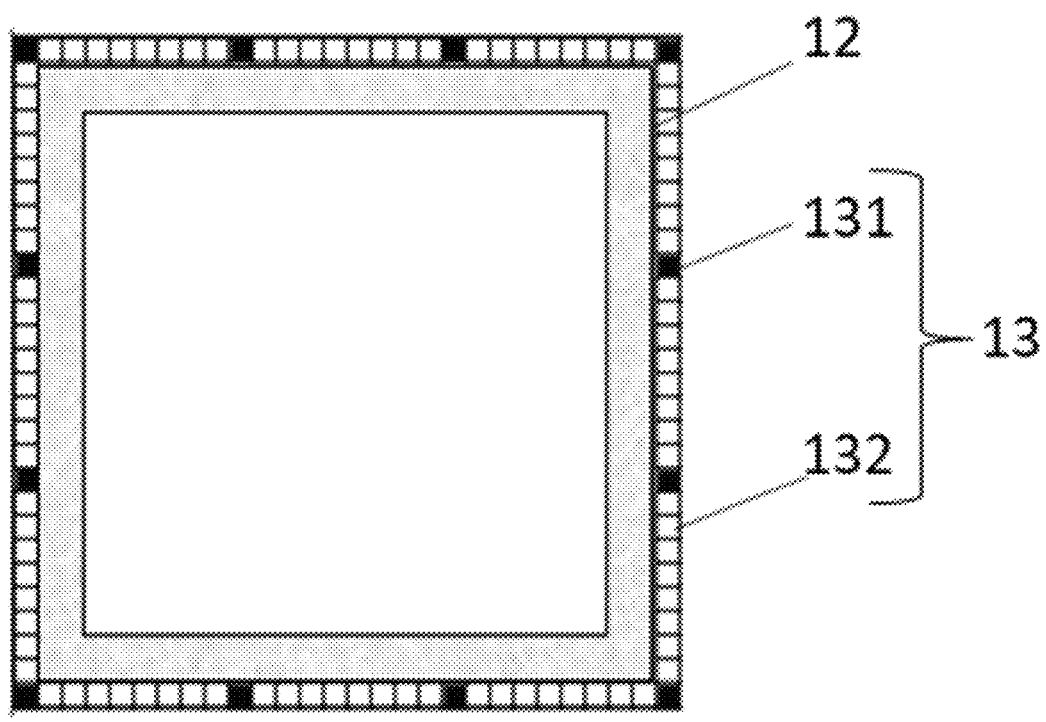
FIG. 2 is a schematic structural diagram of a glass prefabricated tube.

The present application provides a capillary array, as shown in FIG. 1 and FIG. 2, which includes a capillary region; the capillary region includes a plurality of capillaries 1; the plurality of capillaries are arranged with axes parallel to each other; a tube body 12 of each capillary is made of a first glass material; a low refractive index layer 11 is disposed on an inner wall of each capillary; and a refractive index of the low refractive index layers is less than a refractive index of liquid scintillators. Through the combined use of the above technical means, the low refractive index layers may serve as outer layers of optical fibers after filling the capillaries with the liquid scintillators later, the liquid scintillators may serve as core layers of the optical fibers, and the two cooperate to form an optical fiber structure of "the liquid scintillators in a middle region and the low refractive index layers around the liquid scintillators", which may form a total reflection interface with the liquid scintillators, and avoid the limitation of the fewer selection type of low refractive index glass on the outer layers of the liquid scintillator optical fibers, thereby expanding a selection range of the first glass material, and meanwhile also improving a numerical aperture of the optical fibers by controlling a difference between the refractive indexes of the two. Based on the above design, the selection of the first glass material only needs to consider the needs of capillary array manufacturing, without considering an issue of refractive index.

Figure 3:
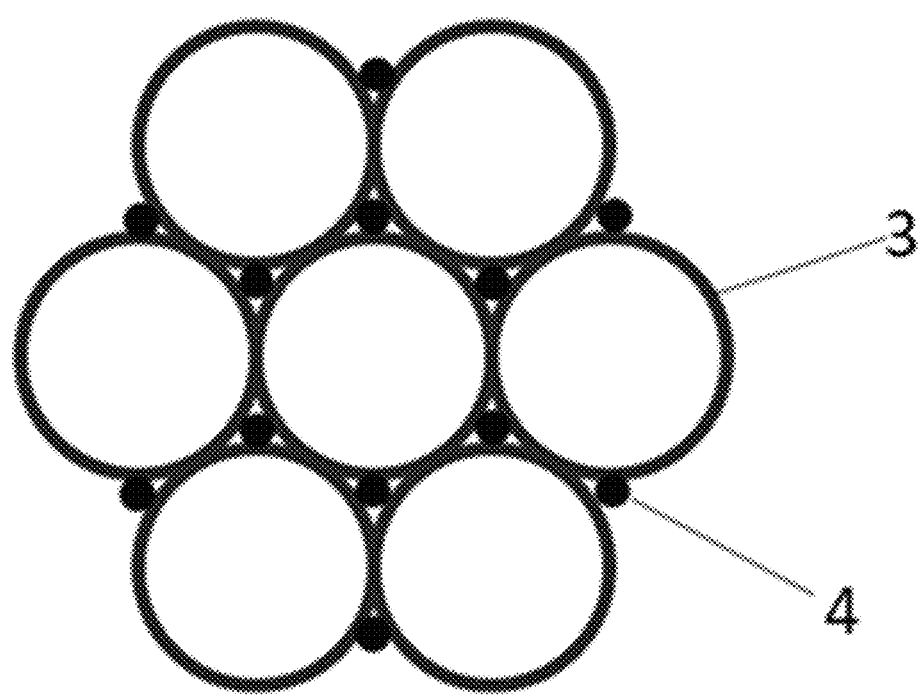
FIG. 3 is a schematic structural diagram of a multifilament rod in the prior art.

In order to avoid light crosstalk between adjacent capillaries, a light absorption layer 13 of a second glass material is further disposed between any two adjacent capillaries in the technical solution of the present application. The light absorption layer is tightly coated on an outer side of each capillary, and effectively blocks crosstalk light between the capillaries, which is an improvement over the prior art. Specifically as shown in FIG. 3, the light crosstalk between capillaries 3 in the prior art is solved by inserting light absorption filaments 4 between the capillaries. However, it can be seen from the figures that if there are gaps between the light absorption filaments, light crosstalk still occurs. The present application disposes the fully coated light absorption layer on the outer side of each capillary to avoid or slow down the crosstalk light and improve a spatial resolution.

The capillary array of the present application further includes an edge covering region 2. The edge covering region has two main functions: first, a softening point of the edge covering region is low, so the edge covering region softens first in a subsequent melting and pressing process, which can homogenize a pressure on a billet during melting and pressing, thus playing a role similar to hot isostatic pressing; and second, the edge covering region is formed by melting and pressing solid fibers together, which can protect the capillaries in the array region and prevent the capillaries from being damaged by external force. The edge covering region is disposed on an outer side of the capillary region and makes contact with an outer side face of the capillary region to merge into a whole; and a material of the edge covering region is third glass.

In order to adapt to a preparation process of the capillary array and to make a pore structure of a cross-section of the capillaries to have a good shape retention during the preparation process, the prepared capillaries have high uniformity in aperture. When selecting first glass, second glass, and the third glass in the present application, the first glass, the second glass, and the third glass should meet the following relationship:

1. a softening point of the first glass is $T_1$, a softening point of the second glass is $T_2$, and a softening point of the third glass is $T_3$, wherein a value of $T_1$ minus $T_2$ is in a range from 30° C. to 50° C., and a value of $T_2$ minus $T_3$ is in a range from 50° C. to 100° C.; that is to say, there is a gradient in the softening points of the first glass, the second glass, and the third glass, so that when the capillaries are drawn (the glass of the edge covering region has not been added yet at this time), the glass of the absorption layers is softened and fused first, while the glass of the inner walls can still maintain its original shape; and when the capillaries are fused and pressed (the glass of the edge covering region has already been coated at this time), the material of the edge covering region is softened and fused first, while the capillaries on the array region can still maintain its original shape at the same time, which can solve a problem of deformation of the capillaries due to extrusion at a high temperature. However, if the softening point is too low, its viscosity will be too low, which will result in too small support capability for a capillary bundle in the array region, and the capillary bundle being prone to deforming and falling apart. Therefore, the above temperature difference can be selected in the present application.

2. A thermal expansion coefficient of the first glass is $\alpha_1$, and a thermal expansion coefficient of the third glass is $\alpha_3$, wherein a value of $\alpha_1$ minus $\alpha_3$ is in a range from $2\times10^{-7}/°$ C. to $10\times10^{-7}/°$ C. The thermal expansion coefficient $\alpha_3$ of the edge covering region during melting and pressing should be less than the thermal expansion coefficient $\alpha_1$ of the capillaries, so that the capillary bundle can be fused under the action of compressive stress. However, the thermal expansion difference between the two should not be too large, otherwise a relatively large residual stress tends to exist after the continuous high-temperature and high-pressure melting and pressing process, and the billet tends to be ruptured.

One of uses of the capillary array in the technical solution of the present application is to prepare the capillary array into a liquid scintillator fiber optical panel. The present application further provides a liquid scintillator fiber optical panel, including the aforementioned capillary array. Each capillary of the capillary array is filled with a liquid scintillator, and then two ends of the capillary array filled with the liquid scintillators are covered with end-sealing components, so as to form the liquid scintillator fiber optical panel.

In order to ensure that the capillary array has good light transmission performance after being prepared into the liquid scintillator fiber optical panel and that the capillary array can achieve a resolution on an order of magnitude of 10 μm in subsequent applications, its aperture cannot be too large. Optionally, an inner diameter of the capillaries in the present application is on an order of magnitude of 10 μm. The order of magnitude of 10 μm mentioned here refers to the inner diameter of the capillaries being in a range from 10 μm to 99 μm. At the same time, the aperture of the capillaries should not be too low, because if the aperture of the capillaries is too low, the amount of the liquid scintillators filled in the single capillary will be too small, which cannot excite sufficient fluorescence and make it difficult to be used in the liquid scintillator fiber optical panel. In order to ensure the quality of fiber optical image transmission and to enable the capillary array to be smoothly applied in the liquid scintillator fiber optical panel, further optionally, the inner diameter of the capillaries in the present application is in a range from 10 μm to 30 μm.

The present application further provides a preparation method for a capillary array, specifically including the following steps:

the first step is to prepare glass materials for first glass, second glass, and third glass, with softening point temperatures and coefficients of thermal expansion meeting the aforementioned requirements, wherein the second glass is light absorption glass, or the second glass includes the light absorption glass and low softening point glass.

The second step is prefabrication of the various first glass, second glass, and third glass mentioned above, including:

the first glass is processed into a glass tube, and in order to make drawn capillaries have a square aperture, optionally, a cross-section of the glass tube is an annular cross section with a square inner side contour and a square outer side contour; a wall thickness of the glass tube is in a range from 2 mm to 4 mm, and an inner diameter is in a range from 20 mm to 50 mm; and for the glass tube with the annular cross-section with the square inner side contour, its inner diameter refers to an opposite side distance. When the capillary array is used for fiber optical image transmission, it is used in a form of a liquid scintillator fiber optical panel. Its emitting end is generally connected with photosensitive elements such as a CCD or a CMOS, and pixels of the photosensitive elements such as the CCD or the CMOS are all square. However, in a capillary array in the prior art, a cross-section of a single capillary is circular, so the single capillary cannot correspond to the pixels of the photosensitive elements such as the CCD or the CMOS one to one, resulting in low coupling efficiency between the liquid scintillator fiber optical panel and the photosensitive elements such as the CCD or the CMOS. In the present application, the first glass is processed into the glass tube of which the cross-section is the annular cross section with the square inner side contour and the square outer side contour; and after the glass tube is processed by drawing and the like, a radial cross section of each capillary is an annular cross section with the square inner side contour and the square outer side contour, so that the capillaries can correspond to the square pixels of the photosensitive elements such as the CCD or the CMOS one to one, thereby improving its coupling efficiency.

The second glass and the third glass are both processed into glass rods, cross sections of the glass rods are both square, and a distance between a group of opposite side faces of the glass rods is in a range from 20 mm to 50 mm; and then the aforementioned glass rods are drawn into monofilaments with cross sections being square, and an opposite side distance of the monofilaments is in a range from 0.3 mm to 2 mm.

In terms of selecting sizes of the rods and the tubes mentioned above, if the rods and the tubes are too thin, a utilization rate of the material may be too low, while if the rods and the tubes are too thick, a temperature difference between centers and peripheries of the rods and the tubes during drawing may be too large, resulting in poor aperture uniformity of the capillaries prepared later. In terms of wall thickness, the reason for the above settings is to ensure that the final capillaries have the necessary strength, while not reducing detection efficiency due to excessively large wall thickness and excessively low duty cycle. The reason for setting the size of the square filaments is to meet the requirement of surrounding the peripheries of the square glass tubes without excessively reducing the duty cycle.

The third step is to arrange the monofilaments drawn from the second glass around the periphery of the glass tube of the first glass in a fully coating manner to form a prefabricated tube, so as to absorb the crosstalk light in all 360° directions. As shown in FIG. 2, that is, a tube body itself of the glass prefabricated tube includes two layers of glass, consisting of the first glass on an inner side and the second glass on an outer side, wherein the monofilaments drawn from the second glass may all be monofilaments 132 of the light absorption glass. However, if an absorption effect of the light absorption glass is too strong and its content is too high, it may cause light absorption components to diffuse into the capillary glass to absorb effective light. At this time, a proportion of the light absorption glass may be appropriately reduced. Therefore, it may also simultaneously include monofilaments 131 of the low softening point glass and the monofilaments 132 of the light absorption glass, and the two are mixed in a certain proportion and then arranged according to an established arrangement rule. During specific operations, a mixing proportion of the two may be determined according to an absorption capability of the light absorption glass, if the light absorption glass has a strong absorption capability, the proportion of the light absorption glass is reduced, otherwise the proportion of the light absorption glass is increased. In the present application, by disposing the light absorption glass (with the softening point being less than that of the first glass) between the capillaries, or by disposing the light absorption glass (with the softening point being less than that of the first glass) and the low softening point glass between the capillaries, on the one hand, the light absorption glass may be used for absorbing the crosstalk light between the capillaries, and at the same time, the shape retention of the capillaries can further be improved; and the low softening point glass is used for adjusting the light absorption effect, and also has the effect of improving the shape retention of the capillaries at the same time.

The fourth step is to draw the prefabricated tube into capillaries, and drawing is usually performed for two times; first, first drawing of the prefabricated tube is performed to obtain a plurality of square primary multifilaments; an opposite side distance of a cross section of each primary multifilament is optionally in a range from 0.5 mm to 2 mm; the reason for the above size settings is that if the opposite side distance is too small, it may increase the difficulty of subsequent rod arrangement operations; however, if the opposite side distance is too large, the precision of a filament diameter during drawing is difficult to control, resulting in significant deviations and causing more gaps during rod arrangement, thereby affecting the regularity of the capillary array. Then, the primary multifilaments are stacked and arranged in a square array to obtain a multifilament rod with a square cross-section; and an opposite side distance of the multifilament rod is optionally in a range from 20 mm to 50 mm to meet the requirements of material utilization rate and temperature homogenization. Afterwards, second drawing is performed on the primary multifilaments to obtain square secondary multifilaments; and an opposite side distance of a cross section of each secondary multifilament is optionally in a range from 0.5 mm to 2 mm to meet the requirements of precision control and subsequent array arrangement. After two times of drawing, a radial section of the single capillary is square.

The fifth step is to arrange the square secondary multifilaments into a square capillary bundle, and wrap a plurality of layers of third glass monofilaments around the periphery to form an edge covering region, thereby forming a billet; and a thickness of the edge covering region is optionally in a range from 5 mm to 20 mm, that is, in a radial direction of the capillaries, a one-side thickness of the edge covering region is in a range from 5 mm to 20 mm. The reason for setting the wall thickness of the edge covering region is that the edge covering region plays a role in softening first during melting and pressing to facilitate stress homogenization. Therefore, if the wall thickness of the edge covering region is too small, the homogenization effect is not significant; while if the wall thickness of the edge covering region is too large, it may cause unnecessary material waste.

The sixth step is to load the billet into a melting and pressing mold for high-temperature melting and pressing. A melting and pressing temperature is higher than the softening point of the second glass and less than the softening point of the first glass, that is, the melting and pressing temperature T is: $T_2<T<T_1$. At this melting and pressing temperature, the absorption layers are already in a softened state while the capillaries are still not softened, so that the capillaries are fused with each other through the glass of the absorption layers while still maintaining a square structure.

The seventh step is to perform end face processing, and the specific operation is to use a cutting machine to process end faces into planes perpendicular to an axial direction of the capillaries; and then perform ultrasonic cleaning and drying on the billet. During cutting, water is used as cooling liquid to facilitate subsequent cleaning. Ultrasonic cleaning and drying are performed on the billet to remove impurities such as glass debris or cutting fluid that enter the capillaries during end face processing.

The eighth step is to plate a low refractive index layer on the inner wall of each capillary in the billet after end face processing. Film layer plating optionally uses an atomic layer deposition technology to deposit a low refractive index thin film on the inner wall of each capillary. This is because the atomic layer deposition technology can achieve uniform film coating on inner walls of deep pores. Due to that the refractive index of the $SiO_2$ film layers may be as low as 1.46, the material of the film layers is optionally $SiO_2$, and a high numerical aperture may be obtained after filling with a liquid scintillator; and a thickness of the film layers is optionally ≥0.5 µm, so that fluorescence can be reflected without penetrating through the film layers.

The following will further illustrate the present application in conjunction with specific embodiments, but it cannot be understood as a limitation on the scope of protection of the present application. Some non-essential improvements and adjustments made by those skilled in the art based on the above content of the present application still fall within the scope of protection of the present application.

Unless otherwise specified, the materials, reagents, and the like referred below are all commercially available products that are well-known to those skilled in the art; and unless otherwise specified, the methods described are all well-known in the art. Unless otherwise defined, the technical or scientific terms used shall have the usual meanings understood by those ordinarily skilled in the art to which the present application belongs.

Embodiment 1

This embodiment prepares a capillary array and a liquid scintillator fiber optical panel, in which four types of glass materials in total are used:
a softening point of first glass is 606° C., and a thermal expansion coefficient is $92\times10^{-7}$/° C.;
second glass includes two types, wherein a softening point of light absorption glass is 576° C., and a softening point of low softening point glass is 570° C.; and
a softening point of third glass is 506° C., and a thermal expansion coefficient of the edge covering glass is $82\times10^{-7}$/° C.

A specific preparation process is as follows:

1) the first glass is processed into a glass tube with a square cross section, with a wall thickness of 2 mm and an inner diameter of 20 mm.

2) The light absorption glass, the low softening point glass, and the third glass are processed into glass rods with a square cross section and an opposite side distance of 20 mm. The square glass rods are drawn into square light absorption monofilaments, low softening point glass monofilaments, and third glass monofilaments, wherein opposite side distances of both the light absorption monofilaments and the low softening point glass monofilaments are 0.3 mm, and an opposite side distance of the edge covering glass monofilaments is 0.5 mm.

3) The low softening point glass monofilaments and the light absorption monofilaments are mixed in a ratio of 1:1 and are arranged around the periphery of the square glass tube in a fully coating manner to form a prefabricated tube.

4) The prefabricated tube is drawn into capillaries. The specific steps are as follows: first, first drawing of the prefabricated tube is performed to obtain a plurality of square primary multifilaments, wherein an opposite side distance of a cross section of each primary multifilament is 1 mm; then the primary multifilaments are stacked and arranged in a square array to obtain a multifilament rod with a square section, wherein an opposite side distance of the primary multifilament rod is 30 mm; and then second drawing is performed on the primary multifilaments to obtain square secondary multifilaments, wherein an opposite side distance of a cross section of each secondary multifilament is 0.5 mm.

5) The square secondary multifilaments are arranged into a square capillary bundle, and ten layers of the third glass monofilaments are covered around the periphery of the square capillary bundle to form an edge covering region, thereby forming a billet, wherein a thickness of the edge covering region is 5 mm.

6) The billet is loaded into a melting and pressing mold to be fused and pressed at 595° C.

7) Water is used as cooling liquid, a cutting machine is used to process end faces of the fused and pressed billet into planes perpendicular to an axial direction of the capillaries; and ultrasonic cleaning and drying are performed on the billet.

8) An atomic layer deposition technology is used to deposit an $SiO_2$ thin film on an inner wall of each capillary, wherein a film layer thickness is 0.6 μm.

An optical microscope is used for testing, in the capillary array prepared in this embodiment, a capillary aperture is 12.9 μm, and a wall thickness is 3.8 μm.

The capillaries are filled with liquid scintillators, and two ends are packaged with a quartz lens and a fiber optical panel with a 5 μm core diameter respectively. The performance of the above liquid scintillator fiber optical panel is tested, a refractive index of the liquid scintillators is 1.57, and a numerical aperture of the liquid scintillator fiber optical panel reaches 0.5; a visible light resolution of the liquid scintillator fiber optical panel reaches 20.1 lp/mm; and coupling efficiency with a CCD is 61%.

Embodiments 2-6

As in Embodiment 1, the specific parameter changes are shown in Table 1 below:

TABLE 1

| | Embodiment 1 | Embodiment 2 | Embodiment 3 | Embodiment 4 | Embodiment 5 | Embodiment 6 |
|---|---|---|---|---|---|---|
| Softening point of first glass | 606° C. | 632° C. | 665° C. | 597° C. | 611° C. | 602° C. |
| Softening point of light absorption glass | 576° C. | 597° C. | 615° C. | 555° C. | 580° C. | 557° C. |
| Softening point of low softening point glass | 570° C. | 590° C. | Without low softening point glass | 563° C. | 577° C. | 555° C. |
| Softening point of third glass | 506° C. | 533° C. | 537° C. | 505° C. | 480° C. | 481° C. |
| Coefficient of thermal expansion of first glass | $92 \times 10^{-7}$/° C. | $88 \times 10^{-7}$/° C. | $90 \times 10^{-7}$/° C. | $87 \times 10^{-7}$/° C. | $98 \times 10^{-7}$/° C. | $87 \times 10^{-7}$/° C. |
| Coefficient of thermal expansion of third glass | $82 \times 10^{-7}$/° C. | $79 \times 10^{-7}$/° C. | $88 \times 10^{-7}$/° C. | $83 \times 10^{-7}$/° C. | $90 \times 10^{-7}$/° C. | $80 \times 10^{-7}$/° C. |
| Wall thickness of square glass | 2 mm | 3 mm | 2.5 mm | 3 mm | 4 mm | 2 mm |
| Inner diameter of glass | 20 mm | 30 mm | 50 mm | 30 mm | 40 mm | 22 mm |
| Opposite side of glass rod | 20 mm | 22 mm | 50 mm | 30 mm | 40 mm | 30 mm |
| Opposite side of second glass monofilament | 0.3 mm | 0.3 mm | 0.5 mm | 2 mm | 1 mm | 0.5 mm |
| Opposite side of third glass monofilament | 0.5 mm | 2 mm | 0.5 mm | 0.5 mm | 1 mm | 1.2 mm |
| Ratio of light absorption to low softening | 1:1 | 1:2 | Without low softening point glass | 3:1 | 3:1 | 5:1 |
| Opposite side of primary multifilament | 1 mm | 0.5 mm | 2 mm | 1 mm | 1 mm | 0.8 mm |
| Opposite side of primary multifilament rod | 30 mm | 20 mm | 50 mm | 30 mm | 40 mm | 32 mm |
| Opposite side of secondary multifilament | 0.5 mm | 2 mm | 0.5 mm | 0.5 mm | 1 mm | 1.2 mm |
| Number of layers of edge covering region | 10 layers | 5 layers | 12 layers | 15 layers | 20 layers | 10 layers |
| Wall thickness of edge covering region | 5 mm | 10 mm | 6 mm | 7.5 mm | 20 mm | 12 mm |
| Melting and pressing temperature | 595° C. | 610° C. | 630° C. | 563° C. | 589° C. | 560° C. |
| Low refractive index layer | $SiO_2$ | $MgF_2$ | $SiO_2$ | $SiO_2$ | $SiO_2$ | $SiO_2$ |
| Film layer thickness | 0.6 μm | 0.7 μm | 1 μm | 0.9 μm | 0.5 μm | 0.8 μm |
| Aperture of capillary | 12.9 μm | 42.5 μm | 14.8 μm | 11.2 μm | 20.3 μm | 23.9 μm |
| Wall thickness of capillary | 3.8 μm | 7.5 μm | 5.2 μm | 5.5 μm | 4.7 μm | 6.1 μm |
| Numerical aperture | 0.50 | 0.56 | 0.7 | 0.50 | 0.62 | 0.66 |
| Visible light resolution | 20.1 lp/mm | 8.98 lp/mm | 14.3 lp/mm | 22.6 lp/mm | 16.0 lp/mm | 12.7 lp/mm |

TABLE 1-continued

| | Embodiment 1 | Embodiment 2 | Embodiment 3 | Embodiment 4 | Embodiment 5 | Embodiment 6 |
|---|---|---|---|---|---|---|
| Coupling efficiency | 61% | 59% | 60% | 57% | 55% | 61% |

COMPARATIVE EXAMPLE

A liquid scintillator fiber optical panel in the prior art is tested, a numerical aperture thereof may reach up to 0.3, and a visible light resolution may reach up to 2.24 lp/mm; and coupling efficiency with a CCD may reach up to 40%.

It may be seen from test data of the embodiments of the present application and comparative examples that the liquid scintillator fiber optical panel prepared by the technical solutions of the present application has the numerical aperture increased by 66% to 134%, the visible light resolution increased by 300% to 798%, and the coupling efficiency with the CCD increased by 37.5% to 52.5%.

The technical features in the claims and/or specification of the present application may be combined, and the combination modes are not limited to the combination obtained through the reference relationship in the claims. The technical solutions obtained by combining the technical features in the claims and/or the specification are also within the scope of protection of the present application.

The above description is only the preferred embodiment of the present application and does not limit the present application in any form. Any simple alterations, equivalent changes, and modifications made to the above embodiments based on the technical essence of the present application still fall within the scope of the technical solutions of the present application.

The invention claimed is:

1. A capillary array, comprising:
a capillary region, comprising a plurality of capillaries made of a first glass material, wherein the capillaries are disposed in an axis-parallel manner; a low refractive index layer is disposed on an inner wall of each of the capillaries; a refractive index of the low refractive index layer is less than a refractive index of a liquid scintillator; a light absorption layer made of a second glass material is disposed between any two adjacent capillaries; a softening point of the first glass is $T_1$, and a softening point of the second glass is $T_2$, wherein a value of $T_1$ minus $T_2$ is in a range from 30° C. to 50° C.; and a thermal expansion coefficient of the first glass is $\alpha_1$; and
an edge covering region disposed at an outer side of the capillary region, wherein the edge covering region is in contact with an outer side face of the capillary region, wherein the edge covering region is made of a third glass, a softening point of the third glass is $T_3$, and a value of $T_2$ minus $T_3$ is in a range from 50° C. to 100° C.; and a thermal expansion coefficient of the third glass is $\alpha_3$, and a value of $\alpha_1$ minus $\alpha_3$ is in a range from $2\times10^{-7}/°$ C. to $10\times10^{-7}/°$ C.

2. The capillary array of claim 1, wherein an inner diameter of the capillary is in a range from 10 microns to 99 microns.

3. The capillary array of claim 1, wherein the low refractive index layer is a $SiO_2$ layer, with a thickness being $\geq 0.5$ μm.

4. The capillary array of claim 1, wherein a single-side thickness of the edge covering region is in a range from 5 mm to 20 mm in a radial direction of the capillary.

5. The capillary array of claim 1, wherein a radial cross-section of a single capillary is a square.

6. The capillary array of claim 1, wherein the light absorption layer is composed of light absorption glass, or composed of light absorption glass and low softening point glass.

7. A method for preparing a capillary array, comprising the following steps:
S1, arranging and drawing glass prefabricated tube to form multifilaments, wherein the glass prefabricated tube is composed of a first glass on an inner side and a second glass on an outer side; a softening point of the first glass is $T_1$, a softening point of the second glass is $T_2$, a value of $T_1$ minus $T_2$ is in a range from 30° C. to 50° C.; and a thermal expansion coefficient of the first glass is $\alpha_1$;
S2, arranging the multifilament into a capillary bundle, and then covering a plurality of layers of third glass monofilaments around a periphery of the capillary bundle to form an edge covering region, obtaining a billet, wherein a softening point of a third glass is $T_3$, and a value of $T_2$ minus $T_3$ is in a range from 50° C. to 100° C.; and a thermal expansion coefficient of the third glass is $\alpha_3$, and a value of $\alpha_1$ minus $\alpha_3$ is in a range from $2\times10^{-7}/°$ C. to $10\times10^{-7}/°$ C.;
S3, melting and pressing the billet, and then cutting two end faces of the billet, a temperature T of the melting and pressing being: $T_2<T<T_1$; and
S4, plating a low refractive index layer in each capillary that consists the capillary bundle, a refractive index of the low refractive index layer being less than a refractive index of a liquid scintillator.

8. The method of claim 7, wherein a method for preparing the glass prefabricated tubes is as follows:
A, processing the first glass into a glass tube, a cross-section of the glass tube being an annular cross section with a square inner side contour and a square outer side contour;
processing the second glass into a glass rod with a square cross-section; and drawing the glass rod into second glass monofilaments; and
B, arranging the second glass monofilaments around a periphery of the glass tube in a fully covered manner to form the glass prefabricated tubes; the second glass monofilaments being light absorption glass monofilaments, or the light absorption glass monofilaments and low softening point glass monofilaments.

9. The method of claim 8, wherein a radial cross section of each glass prefabricated tube is an annular cross section with a square inner side contour and a square outer side contour.

10. The method of claim 7, wherein a method for coating the low refractive index layer is an atomic layer deposition method; and the low refractive index layer is a $SiO_2$ layer, with a thickness being $\geq 0.5$ μm.

11. A liquid scintillation fiber optical panel, comprising:
the capillary array of claim 1;
a liquid scintillator, filled in each capillary of the capillary array; and
end-sealing components, covering two ends of the capillary array filled with the liquid scintillator.

* * * * *